POLYHEXADIENE-1,5 d SPACING vs. COMPOSITION

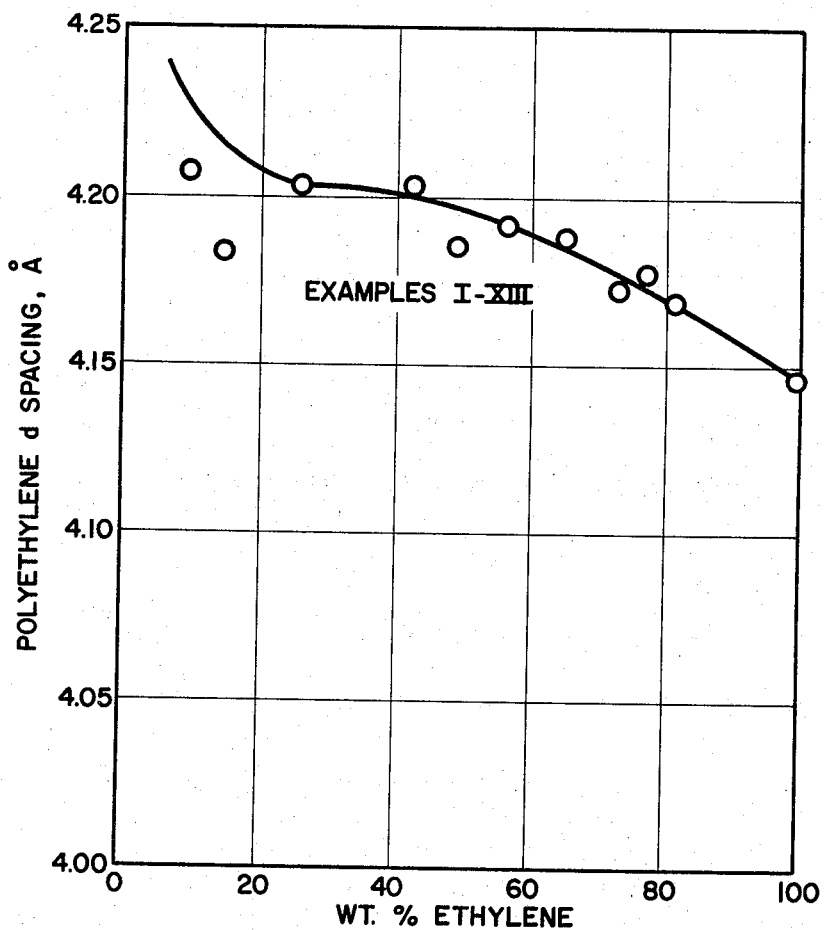

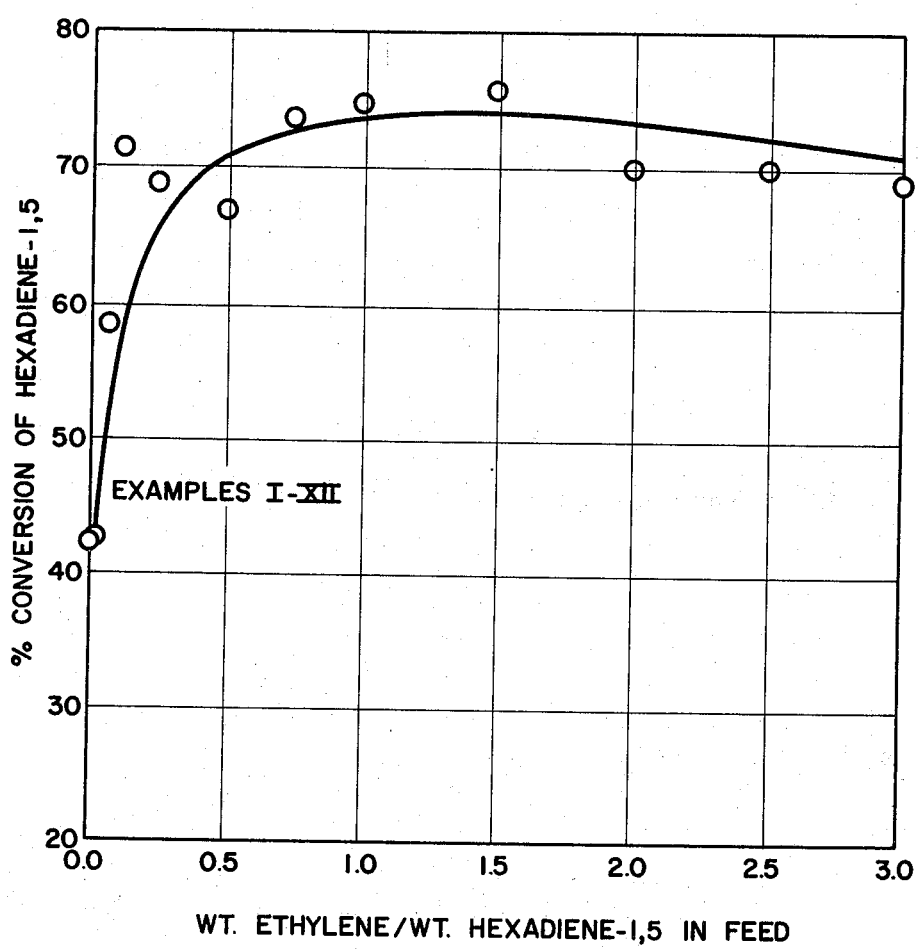

United States Patent Office 3,357,961
Patented Dec. 12, 1967

3,357,961
COPOLYMERS OF ETHYLENE AND
HEXADIENE 1,5
Henry S. Makowski, Scotch Plains, N.J., Benjamin K. C. Shim, Erie, Pa., and William P. Cain, White Plains, N.Y., assignors to Esso Research and Engineering Company, a corporation of Delaware
Filed May 24, 1965, Ser. No. 459,531
2 Claims. (Cl. 260—88.2)

This invention relates to novel copolymers and more particularly to novel copolymers of ethylene and hexadiene-1,5.

This application is a continuation-in-part of S.N. 831,-210, filed Aug. 3, 1959, and now abandoned.

The preparation of polymers and copolymers using catalyst systems made up of reducible heavy transition metal compounds and a reducing metal containing compound is well known to the art; see e.g. Belgian Patent 533,362, "Chemical and Engineering News," Apr. 8, 1957, pages 12 through 16 and "Petroleum Refiner," December 1956, pages 191 through 196. Homopolymers of hexadiene-1,5 and copolymers of ethylene and hexadiene-1,5 have been prepared with certain species of these catalysts, namely, vanadium compounds, in conjunction with diethyl aluminum chloride, however, the resulting polymers have been reported as being essentially amorphous (see Valvassori et al., Chim. Ind. (Milan), 4, 1095 (1962)).

It has now surprisingly been found that certain copolymers containing hexadiene-1,5 are highly crystalline, high melting, tough, and very flexible. More particularly, it has now been discovered that copolymers of ethylene and hexadiene-1,5 can be formed that are crystalline throughout their entire range of composition.

Aspects of the invention can be seen from the attached drawings wherein:

FIGURE 3 is a graph showing polyethylene d-spacing plotted against composition;

FIGURE 4 is a graph showing the product of the weight of ethylene divided by the weight of hexadiene-1,5 in the feed plotted against the percent conversion of hexadiene-1,5 to polymer.

Figure 1:
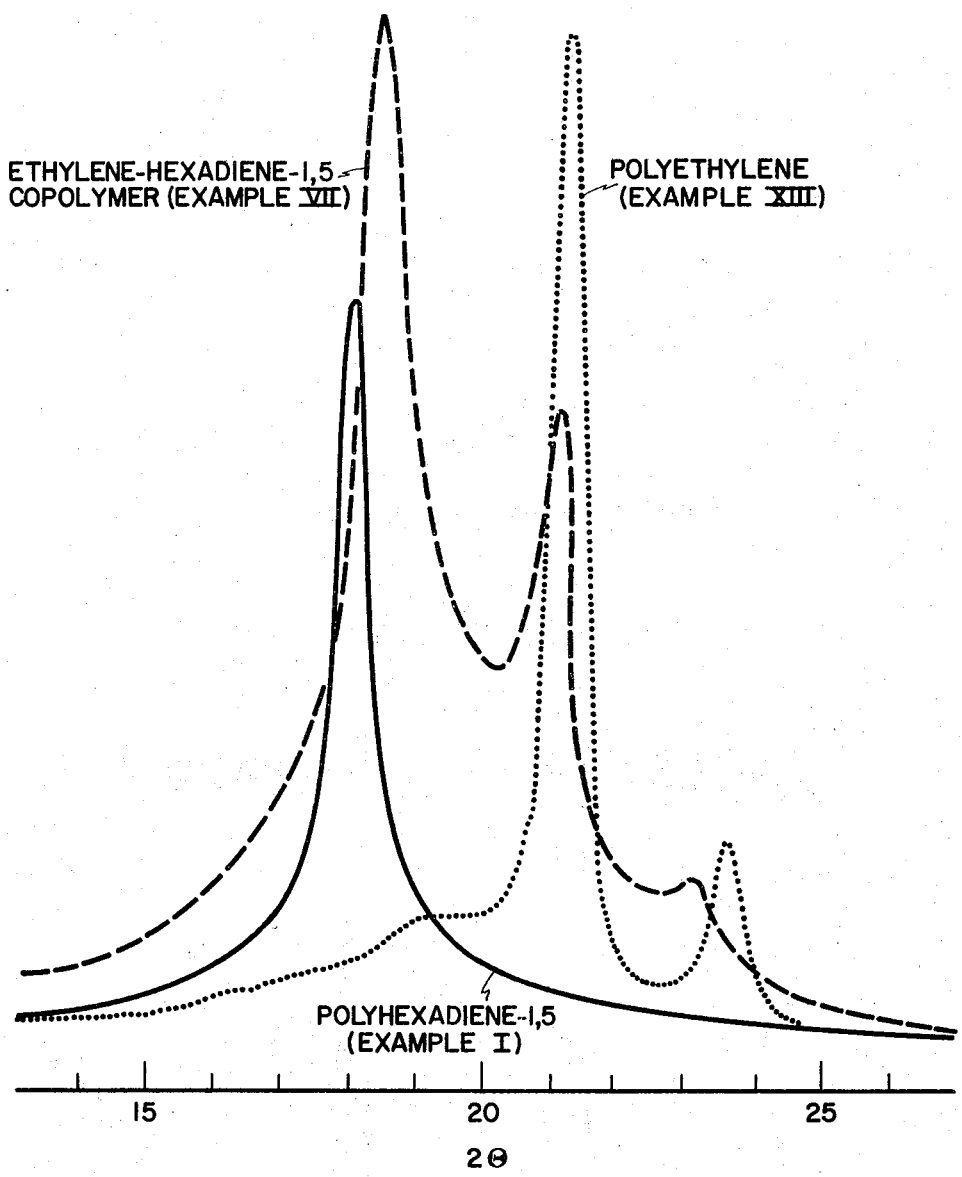
FIGURE 1 is a graph of superimposed X-ray diffraction patterns of polyhexadiene-1,5, polyethylene, and an ethylene-hexadiene-1,5 copolymer.

The hexadiene-1,5 component of the polymers of the invention is either unsubstituted hexadiene-1,5, a 3-alkyl-1,5-hexadiene, or a symmetrical 2,5-dialkyl- or 3,4-dialkyl-1,5-hexadiene. In every case the double bonds of the hexadiene compound should be symmetrical, that is, they should be of equal reactivity to promote cyclization and avoid amorphous polymer formation. The alkyl group may have either a branched or straight chain structure and contains from 1 to 5 carbon atoms, e.g. methyl, ethyl, propyl, isobutyl, etc. with methyl preferred. Unsubstituted hexadiene-1,5 is preferred for use herein.

Copolymers within the scope of this invention contain from 1 to 99 mol percent of the residue of one monomer unit and correspondingly 99 to 1 mol percent of the residue of the other monomer unit. The particular composition chosen will depend on the type copolymer desired. For example, with the copolymer of ethylene and hexadiene-1,5, if a high molecular weight product is desired, a relatively large proportion of ethylene is employed. On the other hand, if it is desired to prepare a copolymer suitable for cross-linking with a curing agent, a relatively large proportion of hexadiene-1,5 may be employed since polyhexadiene-1,5 has some residual unsaturation and hence the higher the ethylene content the lower the unsaturation of the resulting copolymer.

The reason why the copolymers of the invention are crystalline over their entire composition ranges will now be given, although applicants are of course not restricted to any explanation of this phenomenon. Data obtained on polyhexadiene-1,5 has indicated that this crystalline homopolymer is composed predominantly of cyclopentane rings interconnected in the 1,3 positions in a cis manner by methylene groups. These polymers have linear zig-zag chains similar to that of polyethylene. Additionally, since the repeat distance of polyhexadiene-1,5 is about twice that of polyethylene, the unit cells of these homopolymers should be quite similar. Consequently, the unit cell of polyhexadiene-1,5 should accommodate ethylene units with a consequent contraction of its unit cell, and the unit cell of polyethylene should accommodate hexadiene-1,5 units with a consequent expansion of its unit cell. Proof that this has occurred is apparent from FIGURES 1, 2, and 3 attached herewith which will be discussed more in detail later.

The copolymerization of the monomers utilized to form the novel copolymers of the invention is carried out by reacting the desired monomers together in a polymerization zone with a polymerization catalyst at a temperature in the range of from 0° to 125° C., preferably 40° to 100° C. in an aliphatic, alicyclic, or aromatic hydrocarbon diluent, such as n-heptane, n-hexane, n-pentane, isopentane, cyclopentane, cyclohexane, benzene, methylated benzene, chlorobenzene, dichlorobenzene, etc. The pressure utilized is not critical and pressures below or above atmospheric can be used. The polymerization reaction is carried out from 0.25 to 10 hours, preferably 0.5 to 2 hours, until the desired monomer conversion is effected. After the polymerization reaction, polymer isolation is secured by adding to the polymerization mixture an antisolvent such as an alcohol, e.g. methanol, ethanol, isopropyl alcohol, etc. or a ketone, e.g. acetone, methyl ethyl ketone, etc. Also, a combination of an alcohol and a ketone can be used. The antisolvent is generally added in amounts ranging from 0.5 to 3 times the volume of the polymerization mixture. Additionally, small quantities of chelating agents such as diketones, e.g., acetyl acetones, diacetyl, etc., or hydroxy carboxylic acids can be added to aid in solution and removal of catalyst components from the polymer. In general, from 0.5 to 5 wt. percent chelating agent is employed based on the weight of catalyst. The precipitated polymer is then filtered and dried. Additional processing steps known to the polymer art such as a deashing step and the like can be employed as desired.

The polymers of this invention are white solids that are crystalline over the entire range of ethylene and hexadiene-1,5 composition. The polymers exhibit melting points in excess of 100° C., generally in excess of 117° C., and are at least about 75 wt. percent insoluble in boiling n-heptane. Additionally, depending upon the composition and polymerization conditions, the polymers have apparent moduli of elasticity at −50° C. of from 100,000 to 400,000 p.s.i.; tensile strengths bearing from 1,000 to about 6,000 p.s.i.; densities of from 0.920 to 1.12 grams per cc.; and inherent viscosities of from 0.5 to 10, as determined in tetralin at 125° C. Most importantly, the copolymers of this invention are about 25 to 75%, more generally from 40 to 60%, crystalline as determined by X-ray analysis. The preferred copolymers of this invention contain from 4 to 40 mol percent hexadiene-1,5 as these materials contain sufficient sites of unsaturation to be sulphur-cured to highly attractive vulcanizates.

The polymerization catalysts useful in the preparation of the polymers of this invention are those catalysts comprising a mixture of an organo-aluminum compound and a reducible heavy transition metal halide. This catalyst system can be prepared by mixing from about 0.2 to 12 parts of the organo-aluminum compound per part of reducible heavy transition metal halide compound in an inert diluent, either by mixing the total quantities of these components together with or without pretreatment, or by using a staged reduction pretreat technique, i.e. by adding timed increments of the organo-aluminum compound to the total quantity of the transition metal halide compound.

Representative non-limiting examples of suitable organo-aluminum compounds include those alkyl and aryl aluminum derivatives which have sufficient stability to permit the reaction with the reducible heavy transition metal halide compound. Useful aluminum compounds include triisobutyl aluminum, tripropyl aluminum, triethyl aluminum, dialkyl aluminum halides such as diethyl aluminum halides and dimethyl aluminum halides, and the methyl and ethyl aluminum dihalides. Organo-aluminum compounds having two hydrocarbon radicals or at least one hydrocarbon radical and one hydrogen radical and containing an electron attracting group such as an alkoxy, halogen, and organic nitrogen can also be used. Mixtures of the above aluminum compound can be used. Mixtures containing ethyl aluminum dichloride and diethyl aluminum dichloride are quite effective. Particularly preferred catalyst components are the trialkyl aluminum and dialkyl aluminum halide compounds.

All of the above aluminum compounds and the methods for their preparation are well known to the art. The use of strictly organo-aluminum compounds is a critical feature of the process for the formation of the copolymers of this invention. When materials other than organo-aluminum compounds are used to activate the transition metal halide catalyst component, the crystalline copolymers of this invention are not secured. Additionally, aluminum should be the sole cation present in the organo-aluminum compound as materials such as lithium aluminum hydrides and alkyls are unsuitable for use if highly crystalline copolymers of ethylene and hexadiene-1,5 are desired.

Reducible heavy metal compounds which can be used as catalyst components include the halides of the transition metal of the Periodic System, as well as iron and copper. Titanium, zirconium, hafnium, thorium, uranium, vanadium, niobium, tantalum, chromium, molybdenum, tungsten, and manganese halides are highly useful catalyst components. Of the transition metal halides, the chlorides are particularly preferred for use. Titanium, zirconium and vanadium are the preferred metal components since they are the most active of these metals. Materials such as the transition metal oxy-halides, oxides, hydroxides, alcoholates, acetates, benzoates, and acetyl acetonates while normally highly suitable for the polymerization of alpha olefins should not be used in the process of this invention as the products obtained with their use tend to be amorphous.

Preformed catalysts can also be used and, in fact, are preferred in the present invention. These catalysts include either the organo-aluminum activated, partially reduced, heavy transition metal compounds or partially reduced, heavy transition metal compounds cocrystallized with a Group II or III metal halide compound such as aluminum chloride, boron trichloride, zinc chloride, and the like. The heavy transition metal halide compounds useful in a preformed catalyst system generally are the same as those described above, namely, the halides, particularly the chlorides of the transition metals of Groups IV–VIII(A) of the extended form of the Periodic Table found at page 313 of Mack et al., Textbook of Chemistry, Second Edition, Ginn & Co., 1956. Purple crystalline titanium trichloride cocrystallized with aluminum chloride is the most highly effective preformed catalyst component and is particularly preferred for use in the formation of crystalline copolymers of ethylene and hexadiene-1,5.

When the preformed catalyst is a partially reduced heavy transition metal compound cocrystallized with a Group II or III metal compound, the catalyst contains from 0.05 to 1.0, preferably 0.1 to 0.5 moles of the Group II or III compound per mole of partially reduced heavy transition metal compound. The preformed transition metal halide catalyst components can be prepared by any of a number of procedures known to the art. For example, purple crystalline titanium trichloride can be prepared by the hydrogen reduction of titanium tetrachloride at temperatures above about 650° C. or by heat reduction of titanium tetrachloride at temperatures above about 1,000° C. The cocrystallized catalyst component, namely, titanium trichloride cocrystallized with aluminum chloride can be prepared by the reduction of titanium tetrachloride with aluminum powder in xylene at temperatures varying from 100 to 175° C. at or near atmospheric pressure. Similarly, the cocrystallized component can be prepared by the metal reduction of titanium tetrachloride with either aluminum powder, titanium powder, or mixtures of aluminum and titanium powder in the absence of a solvent at elevated temperatures. The above-described preformed catalysts or the earlier-described pretreated catalysts are activated with organo-aluminum compounds, preferably alkyl aluminum halides or trialkyl aluminum compounds in amounts varying from 0.1 to 5.0 moles of the organo-aluminum compound per mole of the transition metal halide component. Catalyst concentrations in the reaction mixture vary from 0.1 to 20 grams per liter, preferably 0.5 to 3.0 grams per liter.

The copolymers of this invention have many varied uses. The polymers, because of their highly crystalline character, may be formed into fibers and films. Additionally, the copolymer products, because of the presence of minor amounts of unsaturation, may be vulcanized using sulfur and accelerators such as 2-benzo thiazyl disulfide, mercaptobenzothiazole, cyclohexyl-2-benzo-thiazyl sulfenamide, tellurium diethyl dithiocarbamate, etc. Carbon blacks such as the channel blacks, furnace blacks and thermal blacks and/or mineral fillers such as the oxides, hydroxides, carbonates, etc., of silicon, aluminum, magnesium, titanium, or the silicates or aluminates of the various elements indicated may be compounded with the copolymer products of the present invention. The cured compound copolymers of this invention may be utilized in the preparation of wiring cable coatings, mechanical goods, as well as for a wide variety of coated and molded articles.

This invention will be further illustrated by the following examples which demonstrate the preparation and properties of the copolymers of this invention.

*Examples I to XIII*

Into a dry one liter resin flask were placed one liter of purified n-heptane, 0.90 grams of $TiCl_3 \cdot 0.22$ $AlCl_3$ and 0.78 grams of $AlEt_3$ in a nitrogen atmosphere. The temperature of the catalyst slurry was raised to 60° C., and hexadiene-1,5 was added all at once in the amounts shown in Table I, and simultaneously ethylene feed was started (except for Example I which is a pure polyhexadiene-1,5). The ethylene was added over 40 minutes at a constant rate in the amounts shown in Table I. During the reaction the temperature was maintained at about 60° C. At the end of 40 minutes, the ethylene feed was discontinued and 100 mls. of isopropyl alcohol was added to the polymerization mixture. The resulting mixture was then added to a solution of 750 mls. of acetone and 750 mls. of isopropyl alcohol. The resulting granular white solid was filtered, washed with acetone, and vacuum oven dried at 50–80° C.

TABLE I

| Example | Hexadiene-1,5 (g.) | Ethylene (g.) |
|---|---|---|
| I | 100 | 0 |
| II | 474 | 12.5 |
| III | 200 | 12.5 |
| IV | 100 | 12.5 |
| V | 100 | 25 |
| VI | 100 | 40 |
| VII | 100 | 60 |
| VIII | 100 | 80 |
| IX | 50 | 60 |
| X | 50 | 80 |
| XI | 50 | 100 |
| XII | 50 | 120 |
| XIII | 0 | 80 |

Details of the polymerization reactions and the properties of the polymers obtained therefrom are given in Table II.

*Examples XIV to XVI*

For purposes of comparison, polyhexadiene-1,5 (Example XIV) and polyethylene (Example XVI) were prepared with a "split pretreated" 2/1 AlEt₃/TiCl₄ catalyst in n-heptane. Details of these preparations are given in Table II. In Example XV, ethylene and hexadiene-1,5 were copolymerized with the above catalyst, the details of which are also given in Table II.

TABLE II

| Example | I | II | III | IV | V | VI | VII | VIII |
|---|---|---|---|---|---|---|---|---|
| Catalyst | AlEt₃/TiCl₃ 0.22 AlCl₃ ᵃ | | | | | | | |
| AlEt₃/Ti Ratio | 1.26 | 1.26 | 1.26 | 1.26 | 1.26 | 1.26 | 1.26 | 1.26 |
| Catalyst Concentration, g./l | 1.68 | 1.68 | 1.68 | 1.68 | 1.68 | 1.68 | 1.68 | 1.68 |
| Diluent | n-heptane ᶜ | n-heptane ᶜ | n-heptane ᶜ | n-heptane ᶜ | n-heptane ᶜ | n-heptane ᶜ | n-heptane ᶜ | n-heptane ᶜ |
| Total Volume, ml | 1,000 | 1,000 | 1,000 | 1,000 | 1,000 | 1,000 | 1,000 | 1,000 |
| Olefin Feed: | | | | | | | | |
| Ethylene: | | | | | | | | |
| Feed, liters | 0 | 10 | 10 | 10 | 20 | 40 | 60 | 80 |
| Absorbed, liters | 0 | 10 | 10 | 10 | 20 | 40 | 60 | 80 |
| Absorbed, g.ᵉ | 0 | 12.5 | 12.5 | 12.5 | 25 | 50 | 75 | 100 |
| Hexadiene-1,5: Feed, g | 100 | 474 | 200 | 100 | 100 | 100 | 100 | 100 |
| Length of run, minutes | 40 | 40 | 40 | 40 | 40 | 40 | 40 | 40 |
| Temperature, °C | 54–62 | 55–60 | 57–60 | 59–61 | 60–61 | 59–61 | 59–60 | 58–61 |
| Polymer, g | 42 | 213 | 129.5 | 84 | 94 | 117 | 149 | 175 |
| Catalyst Efficiency, g./g | 25 | 126 | 77 | 50 | 56 | 70 | 89 | 104 |
| Hexadiene-1,5 in polymer g. ᵈ | 42 | 201.5 | 117 | 71.5 | 69 | 67 | 74 | 75 |
| Ethylene in Polymer, g. ᵈ | 0 | 12.5 | 12.5 | 12.5 | 25 | 50 | 75 | 100 |
| Ethylene in Polymer, wt. percent ᵈ | 0 | 5.9 | 9.7 | 14.9 | 26.6 | 42.7 | 50.3 | 57.1 |
| Ethylene in Polymer, mole percent ᵈ | 0 | 14.9 | 23.3 | 33.8 | 53.5 | 68.6 | 74.8 | 79.7 |
| Conversion of Hexadiene-1,5, percent | 42 | 42.6 | 58.5 | 71.5 | 69 | 67 | 74 | 75 |
| Total Polymer Properties: | | | | | | | | |
| Inherent Viscosity, dl./g.ᵉ | 1.22 | 0.994 | ʲ 1.37 | 1.48 | 1.67 | ʲ 1.81 | 2.28 | 2.76 |
| Tensile Strength, p.s.i.ᵍ | 1,580 | 2,990 | 1,880 | 1,220 | 910 | 1,350 | 940 | 1,045 |
| Elongation, percent ᵍ | 365 | 270 | 340 | 360 | 300 | 370 | 260 | 300 |
| S.P./M.P., °C.ʰ | 114/128 | 124/140 | 100/120 | 108/122 | 102/117 | 108/120 | 106/120 | 118/131 |
| Density, g./cc.ⁱ | 1.0080 | 0.9907 | 0.9904 | 0.9848 | 0.9786 | 0.9622 | 0.9604 | 0.9538 |
| Apparent Modulus of Elasticity, p.s.i.×10⁻⁵ ʲ at: | | | | | | | | |
| 25° C | | | | | | | | |
| 0° C | 0.72 | 0.46 | 0.36 | 0.26 | 0.32 | 0.34 | 0.39 | 0.46 |
| −25° C | 1.07 | 0.99 | 0.80 | 0.70 | 0.78 | 0.89 | 1.02 | 1.03 |
| −50° C | 1.86 | 1.61 | 1.32 | 1.32 | 1.22 | 1.34 | 1.39 | 1.62 |
| Percent n-Heptane Soluble ᵏ | 11.7 | 8.6 | 11.2 | 15.7 | 20.3 | 21.5 | 24.2 | 24.8 |
| Percent Crystallinity ˡ (Unextracted Polymer) | 42.8 | 27.9 | 40.8 | 48.5 | 46.4 | 45.3 | 46.4 | 47. |

| Example | IX | X | XI | XII | XIII | XIV | XV | XVI |
|---|---|---|---|---|---|---|---|---|
| Catalyst | AlEt₃/TiCl₃ 0.22 AlCl₃ ᵃ | | | | | AlEt₃/TiCl₄ ᵇ | | |
| AlEt₃/Ti Ratio | 1.26 | 1.26 | 1.26 | 1.26 | 1.26 | 1.26 | 2/1 | 2/1 |
| Catalyst concentration, g./l | 1.68 | 1.68 | 1.68 | 1.68 | 1.68 | 0.92 | 2.76 | 2.76 |
| Diluent | n-heptane | n-heptane | n-heptane | n-heptane | n-heptane | n-heptane | n-heptane | n-heptane |
| Total Volume, ml | 1,000 | 1,000 | 1,000 | 1,000 | 1,000 | 2,000 | 2,000 | 2,000 |
| Olefin Feed: | | | | | | | | |
| Ethylene: | | | | | | | | |
| Feed, liters | 60 | 80 | 100 | 120 | 80 | 0 | 80 | 99 |
| Absorbed, liters | 60 | 80 | 100 | 120 | 66 | 0 | 68.3 | 99 |
| Absorbed, g.ᵉ | 75 | 100 | 125 | 150 | 82.5 | 0 | 84 | 124 |
| Hexadiene-1,5: Feed, g | 50 | 50 | 50 | 50 | 0 | 346 | 242 | 0 |
| Length of Run, minutes | 40 | 40 | 40 | 40 | 40 | 130 | 40 | 30 |
| Temperature, °C | 59–60 | 58–61 | 60–61 | 60–64 | 59–61 | 40–72 | 56–77 | 48–70 |
| Polymer, g | 113 | 135 | 160 | 184 | 83 | 67 | 256 | 114 |
| Catalyst efficiency, g./g | 67 | 80 | 95 | 109 | 49 | 36 | 46 | 21 |
| Hexadiene-1,5 in polymer, g.ᵈ | 38 | 35 | 35 | 34 | 0 | 67 | 172 | 0 |
| Ethylene in polymer, g. ᵈ | 75 | 100 | 125 | 150 | 83 | 0 | 84 | 114 |
| Ethylene in polymer, wt. percent ᵈ | 66.4 | 74.1 | 78.1 | 81.5 | 100 | 0 | 32.8 | 100 |
| Ethylene in polymer, mole percent ᵈ | 85.4 | 89.3 | 91.2 | 92.8 | 100 | 0 | 58.7 | 100 |
| Conversion of Hexadiene-1,5, percent | 76 | 70 | 70 | 68 | | 19.3 | 71 | |

TABLE II—Continued

| Example | IX | X | XI | XII | XIII | XIV | XV | XVI |
|---|---|---|---|---|---|---|---|---|
| Catalyst | AlEt$_3$/TiCl$_3$ 0.22 AlCl$_3$ [a] | | | | | AlEt$_3$/TiCl$_4$ [b] | | |
| Total Polymer Properties: | | | | | | | | |
| Inherent Viscosity, dl./g.[e] | 3.72 | 3.76 | 4.27 | [f] 4.52 | 9.16 | [f] 1.67 | [f] 1.63 | 4.55 |
| Tensile Strength, p.s.i.[g] | 1,650 | 1,340 | 2,270 | 2,890 | 6,145 | 5,420 | 4,445 | 5,550 |
| Elongation, percent [g] | 490 | 300 | 530 | 540 | 420 | 270 | 440 | 460 |
| S.P./M.P., °C.[h] | 112/123 | 113/124 | 122/131 | 124/133 | 134/146 | 131/137.5 | 122/129 | 133/134 |
| Density, g./cc.[i] | 0.9494 | 0.9455 | 0.9439 | 0.9403 | 0.9314 | 1.1220 | 0.9755 | |
| Apparent Modulus of Elasticity, p.s.i.×10$^{-5}$ [j] at: | | | | | | | | |
| −25° C | | | | 0.34 | 0.69 | | | 0.752 |
| 0° C | 0.30 | 0.37 | 0.38 | 0.58 | 1.07 | 0.86 | | 0.99 |
| −25° C | 0.56 | 0.65 | 0.62 | 1.17 | 1.73 | 1.25 | 0.91 | 1.32 |
| −50° C | 1.10 | 1.24 | 1.17 | 1.79 | 2.95 | 2.00 | 1.34 | 1.98 |
| | 1.75 | 1.86 | 1.93 | | | | | |
| Percent n-Heptane Soluble [k] | 21.1 | 23.0 | 11.8 | 15.2 | 0.5 | | | |
| Percent Crystallinity [l] (Unextracted Polymer) | 55.2 | 47.1 | 45.0 | 42.7 | ~75 | | | |

[a] TiCl$_3$·0.22 AlCl$_3$ prepared by aluminum reduction of TiCl$_4$.
[b] Catalyst pretreated at an Al/Ti ratio of 0.5 to 70° C. for one hour. Additional AlEt$_3$ added prior to polymerization to bring Al/Ti ratio to 2.0.
[c] Assuming 22.4 liters=1 mole ethylene.
[d] Calculated from weight of ethylene absorbed.
[e] Determined at 125° C. in tetralin at a concentration of 0.5 g./l. Examples I–XIII) or 1 g./l. (Examples XIV–XV).
[f] Not completely soluble.
[g] ASTM D-412 on micropads at 10 inches/minutes.
[h] Nalge Instrument.
[i] By titration.
[j] ASTM D-1043.
[k] Soxhlet extraction for 48 hours.
[l] Percent crystallinity was determined from measurements of areas in the X-ray patterns, i.e., intensity vs. diffraction angle patterns. The percent crystallinity was determined from the expression:

$$\text{Percent crystallinity} = \frac{100}{1+K\left(\frac{Aa}{Ac}\right)}$$

where:
Aa=area of amorphous contribution
Ac=area of crystalline contribution
K=calibration constant as determined by the procedure of A. Weidinger et al. (Makromolekulare Chemie, 50, 98, (1961)).

As can be seen by referring to the data of Table II, novel copolymers of ethylene and hexadiene-1,5 that are from about 27.9 to 75% crystalline are produced with either pretreated or preformed transition metal halide catalyst systems. In addition to possessing high crystallinity, the polymer products are all at least 75% insoluble in boiling normal heptane and at melting points in excess of 117° C.

Example XVII

The total polymer products obtained in Examples I through XIII were then extracted with n-heptane in a Soxhlet Extractor for 48 hours. The properties of the insoluble polymer after extraction are given in Table III.

TABLE III

| Example | I | II | III | IV | V | VI | VII |
|---|---|---|---|---|---|---|---|
| Ethylene in Total Polymer, mole percent | 0 | 14.9 | 23.3 | 33.8 | 53.5 | 68.6 | 74.8 |
| Properties of n-Heptane Insoluble Polymer: | | | | | | | |
| Inherent Viscosity, dl./g.[a] | 1.18 | 0.976 | 1.54 | 1.54 | 2.08 | 2.23 | [b] 2.98 |
| Tensile Strength, p.s.i.[c] | 1,810 | | 1,420 | 1,970 | 1,760 | 1,820 | 2,320 |
| Elongation, percent [c] | 270 | | 105 | 280 | 340 | 115 | 330 |
| S.P./M.P., °C.[d] | 128/139 | | 123/134 | 103/119 | 116/131 | 112/127 | 120/136 |
| Density, g./cc.[e] | 1.0080 | | 0.9875 | 0.9822 | 0.9790 | 0.9595 | 0.9561 |
| Apparent Modulus of Elasticity p.s.i.×10$^{-5}$ [f] at: | | | | | | | |
| 25° C | | | | | | | 0.19 |
| 0° C | 0.64 | | 0.48 | 0.40 | 0.36 | 0.27 | 0.33 |
| −25° C | 0.98 | | 0.98 | 1.05 | 0.89 | 0.93 | 0.87 |
| −50° C | 1.69 | | 1.55 | 1.63 | 1.38 | 1.43 | 1.38 |

| Example | VIII | IX | X | IX | XII | XIII |
|---|---|---|---|---|---|---|
| Ethylene in Total Polymer, mole percent | 79.7 | 85.4 | 89.3 | 91.2 | 92.8 | 100 |
| Properties of n-Heptane Insoluble Polymer: | | | | | | |
| Inherent Viscosity, dl./g. | 3.46 | 3.76 | 3.43 | 4.96 | 5.24 | 9.22 |
| Tensile Strength, p.s.i. | 2,970 | 4,130 | 2,770 | 2,935 | 5,630 | 6,390 |
| Elongation, percent | 400 | 505 | 395 | 405 | 535 | 345 |
| S.P./M.P., °C.[d] | 129/246 | 121/133 | 123/142 | 127/138 | 130/141 | 139/150 |
| Density, g./cc.[e] | 0.9496 | 0.9414 | 0.9510 | 0.9389 | 0.9370 | 0.9343 |
| Apparent Modulus of Elasticity, p.s.i.×10$^{-5}$ [f] at: | | | | | | |
| 25° C | 0.22 | 0.30 | 0.24 | 0.34 | 0.46 | 0.87 |
| 0° C | 0.39 | 0.58 | 0.41 | 0.68 | 0.84 | 1.44 |
| −25° C | 0.95 | 1.29 | 1.11 | 1.32 | 1.56 | 2.25 |
| −50° C | 1.63 | 1.79 | 1.68 | 2.40 | 2.52 | 3.42 |

[a] Determined in tetralin at 125° C. at a concentration of 0.5 g./l.
[b] Not completely soluble.
[c] ASTM D-412 on micropads at 10 inches/minute.
[d] On Nalge Instrument.
[e] By titration.
[f] ASTM D-1043.

It can be seen from a comparison of the properties of the n-heptane insoluble fractions of Table III and the total polymers given in Table II that the n-heptane insoluble fractions have even higher tensile strengths, melting points, inherent viscosities and lower densities and additionally, were found to be somewhat stiffer than the corresponding total polymers.

Figure 2:
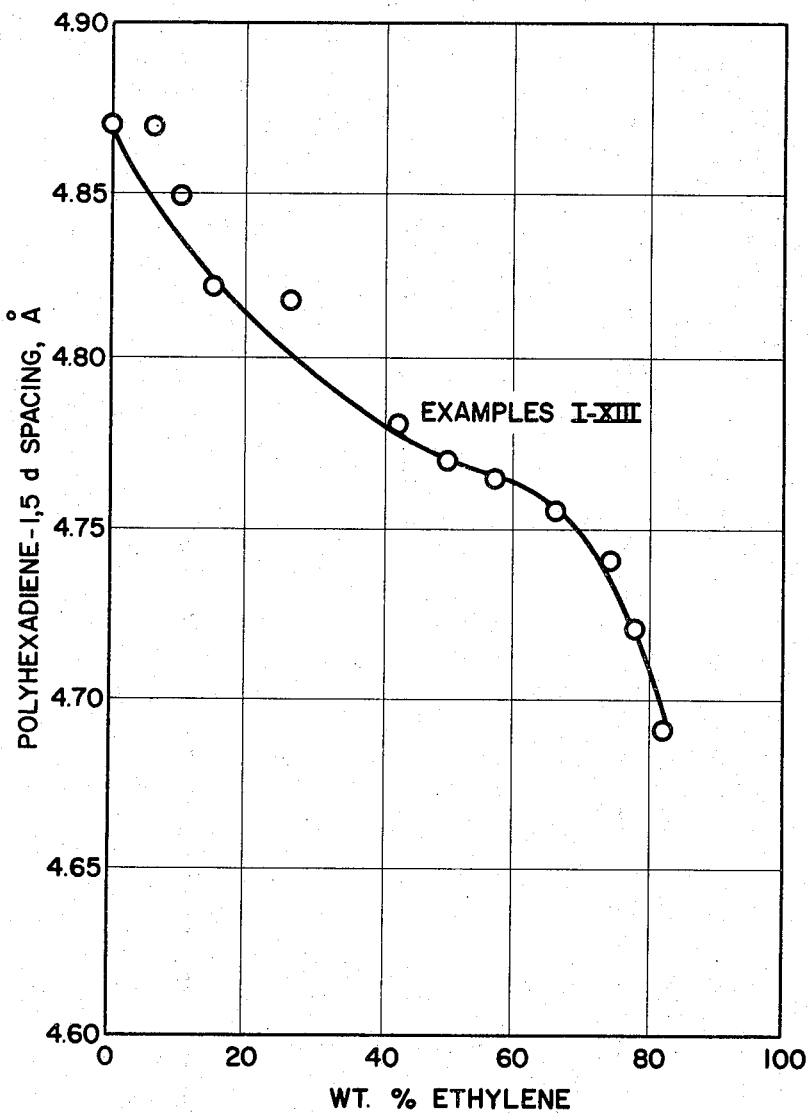
FIGURE 2 is a graph showing polyhexadiene-1,5 d-spacing plotted against composition.

X-ray analyses of the polymers of Examples I to XIII showed them to be crystalline in character. FIGURE 1, which is a comparison of the X-ray diffraction patterns of the polyhexadiene-1,5 of Example I, the polyethylene of Example XIII, and the ethylene-hexadiene-1,5 copolymer of Example VII, illustrates the change that takes place in unit cell dimensions of the homopolymers when monomers of the other type are introduced thereinto. The copolymer of Example VII shows that the polyhexadiene-1,5 peak is shifted to a higher $2\theta$ in the copolymer. This means that the d-spacing has become smaller since the polyhexadiene-1,5 unit cell has contracted. The polyethylene peak, on the other hand, is shifted to a lower $2\theta$ in the copolymer showing that the d-spacing has become larger since the polyethylene unit cell has expanded. The change in d-spacing with composition is shown in FIGURES 2 and 3. In FIGURE 2 the d-spacing of polyhexadiene-1,5 decreases with increasing quantities of ethylene in the polymer. FIGURE 3 shows that the polyethylene d-spacing increases with increasing quantities of hexadiene-1,5 introduced into the polymer.

It can be seen from the above d-spacing data that the ethylene-hexadiene-1,5 polymers are true copolymers and not mixtures of homopolymers. Additionally the melting point data, tensile strength data and torsional modulus data of Tables II and III show that the polymers of the invention are true copolymers.

It was also surprising to discover that even small quantities of ethylene markedly increase the polymerization rate of hexadiene-1,5. The percent conversion of hexadiene-1,5 plotted against the weight of ethylene divided by the weight of hexadiene-1,5 in the feed is shown in FIGURE 4 for Examples I through XII and illustrates this increased polymerization rate.

Modifications in the process for preparing the novel polymers of the invention can be made without departing from the scope and spirit of the invention.

What is claimed is:

1. A copolymer consisting essentially of from 23 to 75 mol percent ethylene units and from 25 to 77 mol percent hexadiene-1,5 units, the hexadiene units of said polymer composed predominantly of cyclopentane rings, said copolymer being from 25 to 75% crystalline as determined by X-ray analysis, and at least about 75 wt. percent insoluble in boiling n-heptane and having a melting point of at least about 117° C.

2. The copolymer composition of claim 1 sulfur-cured to a vulcanizate.

References Cited

UNITED STATES PATENTS 2,933,480  4/1960  Gresham et al. _____ 260—89.5

FOREIGN PATENTS 776,326  6/1957  Great Britain.

OTHER REFERENCES

Valvassori et al.: La Chimica e l'Indrustria, Anno 44, 1095–1100 (1962).

JOSEPH L. SCHOFER, *Primary Examiner.*

W. HOOVER, *Assistant Examiner.*